Inventors
Charles E. Russell
Chester R. Nickols
Andrew F. Wintercorn
Atty

Jan. 11, 1955   C. E. RUSSELL ET AL   2,699,207
MULTIPLE VALVE AND CONTROL MECHANISM THEREFOR
Filed Aug. 28, 1950   6 Sheets-Sheet 2
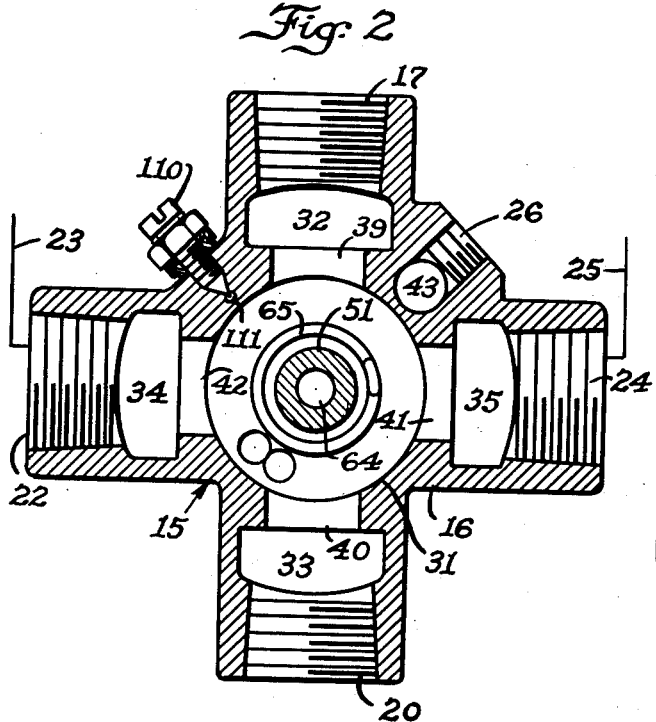
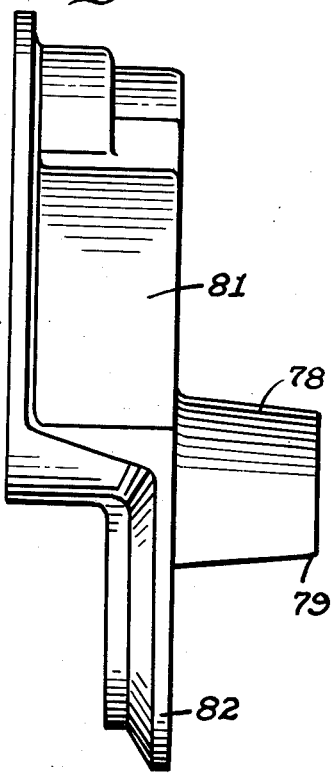
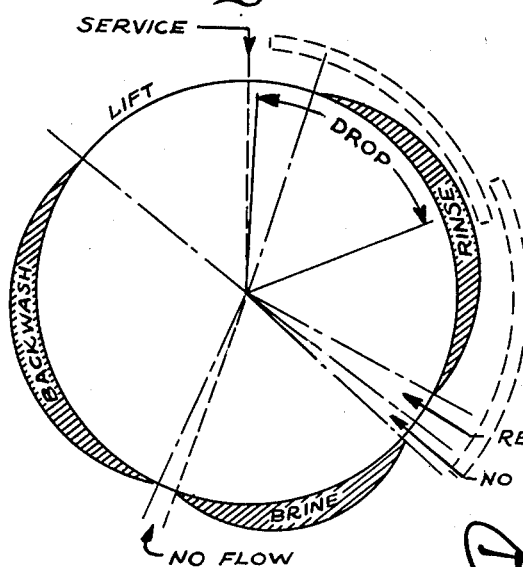
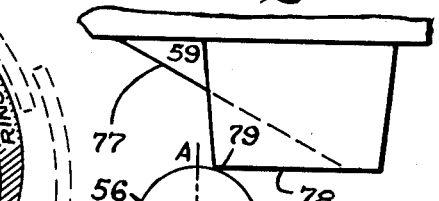
Inventors
Charles E. Russell
Chester R. Nickols
Atty.

Jan. 11, 1955  C. E. RUSSELL ET AL  2,699,207
MULTIPLE VALVE AND CONTROL MECHANISM THEREFOR
Filed Aug. 28, 1950  6 Sheets-Sheet 3

Inventors
Charles E. Russell
Chester R. Nickols
Atty.

Inventors
Charles E. Russell
Chester R. Nickols
Atty.

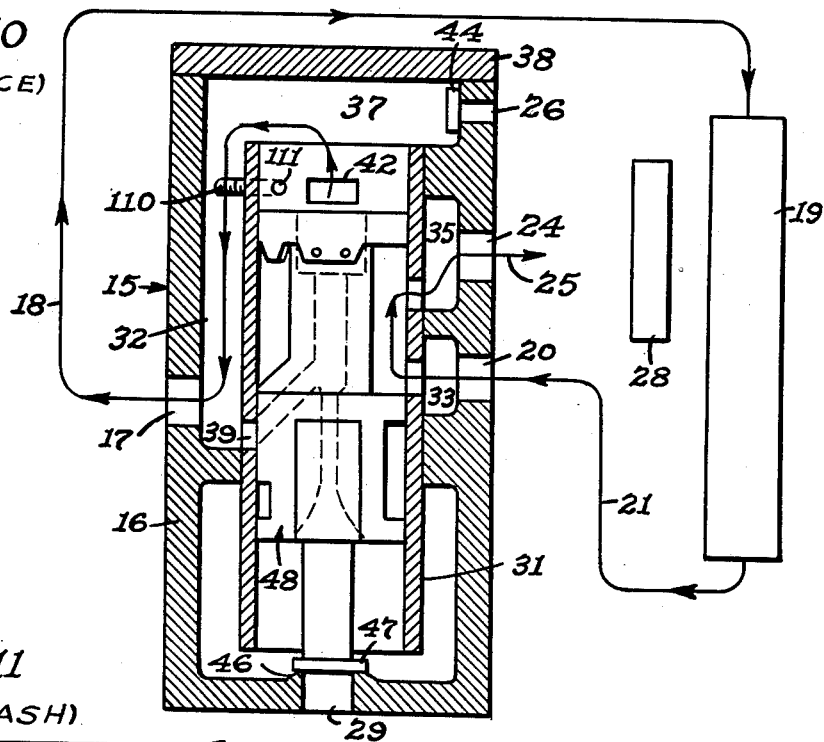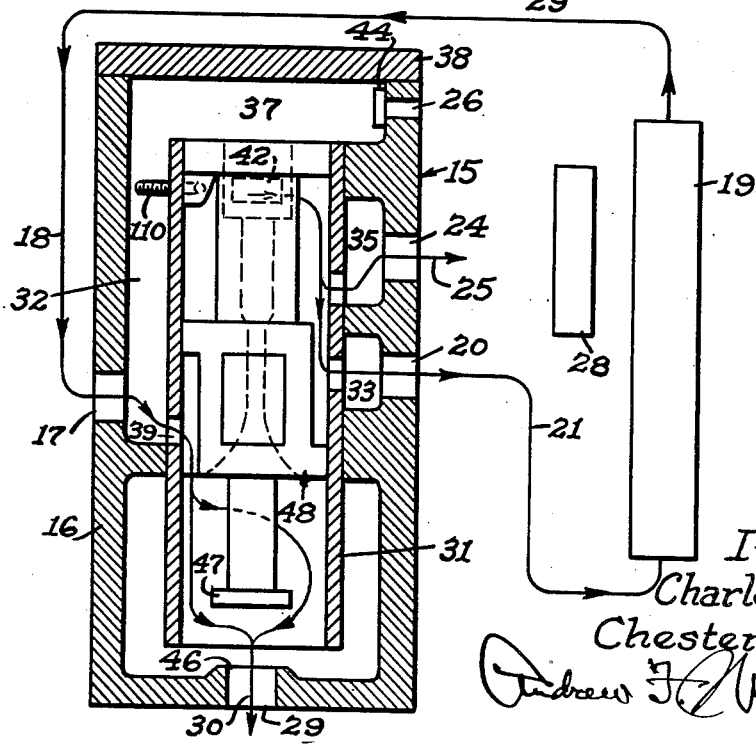

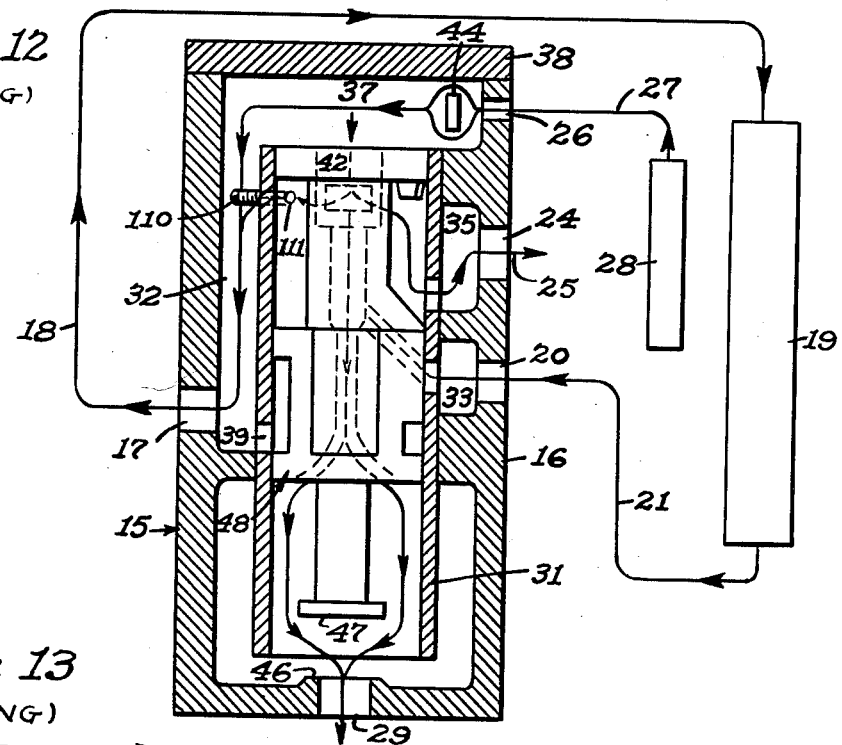
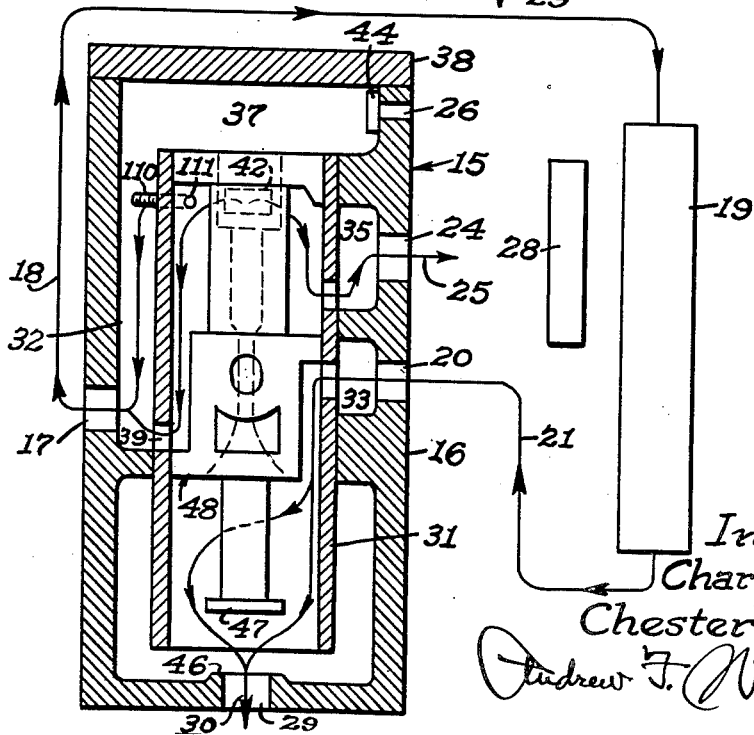

United States Patent Office 2,699,207
Patented Jan. 11, 1955

2,699,207

MULTIPLE VALVE AND CONTROL MECHANISM THEREFOR

Charles E. Russell, Westchester, and Chester R. Nickols, St. Charles, Ill.

Application August 28, 1950, Serial No. 181,822

13 Claims. (Cl. 161—7)

This invention relates to multiple valves adapted for controlling the flows through water softeners, filters, neutralizers, deionizers, and other related apparatus. Thus, in the case of base exchange water softeners, for example, the present valve serves to control the flow for the softening operation and in the several regeneration phases, namely, backwash, brining, refilling (of brine tank), and rinsing. Our invention is more particularly concerned with the provision in connection with such a valve of a control mechanism designed to permit the setting of the valve manually at the time of regeneration, first to the backwash position and thereafter to the brining position, then to the refill position, and finally to the rinsing position. The control mechanism, in accordance with our invention, includes a timing device, such as a clock, which is set into operation manually coincidentally with the manual setting of the valve in the rinsing position and the setting of a trip device, the operation of which by the timing device at the end of the rinsing serves to release the valve so that it will be returned automatically to the softening position, thereby eliminating the necessity for the operator wasting a lot of time waiting for the rinsing operation to be performed, that being the phase which takes up 50% of the entire regeneration time, or even more.

A salient feature of the control mechanism of our invention is the arrangement of the trip device with respect to the timing device so that no load is imposed on the latter which might result in the timing device failing to operate the trip device at the end of the rinsing operation, the trip device in the present case being so related to the timing device that in the critical portion of the operation it actually assists the timing device instead of resisting it.

Another important feature of the present control mechanism is its being so designed that it may be easily attached to a multiple port valve of the manually operated type with little or no change in the latter, thereby converting what would otherwise be a wholly manually operated valve to one that is partially automatic, so as to reduce the necessary attendance time 50% or more.

The invention is illustrated in the accompanying drawings, in which—

Fig. 2 is a cross-section through the valve taken on the broken line 2—2 of Fig. 1 looking in the direction of the arrows;

Fig. 3 is a side view of the housing for the timing device or clock forming a part of the automatic control mechanism;

Fig. 7 is a fragmentary view taken on the line 7—7 of Figs. 4 and 6 showing the relationship of the control mechanism's cam projection to the anti-friction follower roller at the time the valve is set for rinsing;

Fig. 9 is an operation diagram for the multiple valve covering the full cycle of regeneration, and Figs. 10, 11, 12 and 13 are flow diagrams for the multiple valve illustrating "service" or softening, "backwash," "brining," and "rinsing," respectively.

The same reference numerals are applied to corresponding parts throughout the views.

Figure 1:
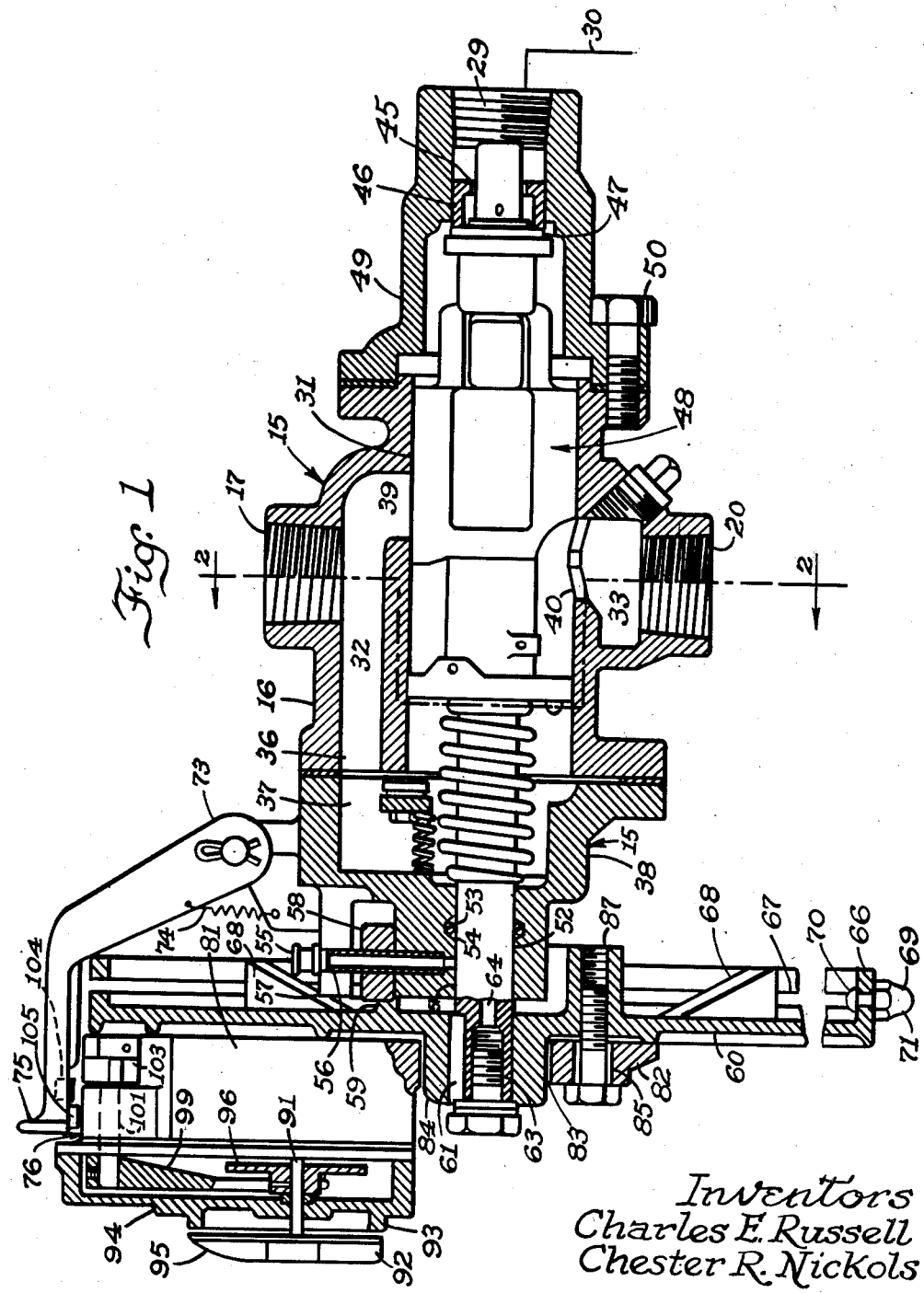
Fig. 1 is a longitudinal sectional through a multiple valve equipped with a control mechanism made in accordance with our invention for partially automatic operation of the valve.

The multiple valve indicated generally by the reference numeral 15, is closely similar in construction to that disclosed in our copending application, Serial #35,404, filed June 26, 1948, and therefore need not be described in such great detail. It should suffice to state that it comprises a body element 16 provided with a number of threaded holes for pipe connections, one of these holes 17 being connected as diagrammatically indicated in Fig. 10 through a pipe 18 with the top of a base exchange water softener 19, while another hole 20 in the same plane with hole 17 communicates with the bottom of the softener through a pipe 21. A third hole 22 in the same plane with holes 17 and 20, is connected with a source of raw water supply through a pipe, as indicated diagrammatically by the line 23 in Fig. 2, and a fourth hole 24 in the same plane with the other three holes communicates with a service system through a pipe, as is also indicated diagrammatically by a line 25 in Fig. 2. Approximately in the same plane as these four holes, 17, 20, 22 and 24, and between holes 17 and 24 there is another hole 26, as indicated in Fig. 2, for a pipe connection 27 leading to a brine tank 28, and at the opposite end of the body 16 there is a threaded hole 29 adapted to receive a pipe connection going to the drain or waste, as indicated diagrammatically by a line 30 in Fig. 1. The body 16 of the valve has a smooth cylindrical bore 31 which, in the diagrammatical views, is represented as provided by a cylindrical sleeve pressed into the body 16 with a water-tight fit, that being in accordance with the disclosure in our copending application. Chambers 32, 33, 34 and 35 are provided in the body communicating with holes 17, 20, 22 and 24 respectively. Chamber 32 is open at one end as indicated at 36 to communicate freely with a chamber 37 formed in the end portion of the body inside the cap 38 which closes that end of the body 16 and is suitably secured thereto by means of screws, not shown. Chambers 33, 34 and 35 are closed at their fore and aft ends. A port 39 establishing communication for chamber 32 with bore 31 is provided in body 16 at that end of chamber 32 remote from the open end 36. In slightly offset relation to port 39 but diametrically opposite it is a port 40 opening from bore 31 into chamber 33. Another port 41 provides communication between bore 31 and chamber 35, and diametrically opposite port 41 is another port 42 connecting chamber 34 with bore 31. The hole 26 for the brine pipe 27 communicates with a chamber 43 in the body 16 which is arranged to be connected with the space 37 inside the cap 38 under control of a valve indicated diagrammatically at 44 in Figs. 10 to 13. In a similar way the drain hole 29 is adapted to communicate with the interior of the body 16 through a port 45 provided in the valve seat insert 46 on which the valve indicated at 47 is arranged to seat. The valve construction as thus far described corresponds substantially to that disclosed in the copending application.

A plunger indicated generally by the numeral 48 is slidable and rotatable with a close working fit in the bore 31 relative to the ports 39—42 mentioned above to establish different flow circuits through the valve in the four different positions of the plunger 48 illustrated in Figs. 10 to 13. The plunger 48 carries the valve 47 on its one end inside a cap 49 that is removably secured to that end of the body 16 remote from the cap 38, one of the screws for fastening the cap 49 being indicated at 50. The valve 47 has a lost-motion connection with the plunger 48 and is spring-pressed in an outward direction relative to said plunger so that the valve 47 will remain in engagement with seat 46 for a time after some initial retracting movement of the plunger, as fully described in our copending application. A hollow reduced stem 51 is provided on the other end of the plunger 48 and extends through a central hole 52 provided in the cap 38, a rubber seal ring 53 being provided in an annular groove 54 opening into hole 52 to prevent leakage of water along the stem in the movement of the stem. Oiling means to lubricate the stem 51 is indicated at 55 and works through a hollow pin 56 inserted in registering holes provided in the forked portion 57 of the cap 38. A cam follower roller 58 is mounted on the pin 56 and runs on a cam-shaped hub 59 keyed on a handwheel 60 keyed as indicated at 61 on the outer end of the stem 51 and secured in place thereon by means of a screw 62 which threads into an enlargement 63 of the outer end of the bore 64 of stem 51. A fairly heavy coiled compression spring 65 surrounds the stem 51 and is compressed between the cap 38 and the adjacent end of the plunger 48 thus tending normally to urge the plunger 48 and the stem inwardly so as to keep the cam 59 in engagement at all times with the roller 58. The rim 66 of the handwheel 60 is annularly slotted, as indicated at 67, the slot being open throughout the circumference of the rim except where the circumferentially spaced webs 68 are provided cast integral with the back face of the wheel and joining the portions of the rim 66 on opposite sides of the slot 67. Adjustable stops 69 are provided on the rim 66 in the form of bolts 70 inserted in the slot 67 with their threaded ends projecting outwardly and having nuts 71 threaded thereon, as indicated in Fig. 1, this construction enabling circumferential adjustment of any one of the stops 69 in either direction by merely loosening the nut 71 and sliding the bolt 70 with it in the proper direction and then tightening the nut again when the bolt has been moved far enough. A lever 72 has a forked inner end pivoted, as indicated at 73, to the cap 38 and extends outwardly over the rim 66 of the handwheel 60 for cooperation with the stops 69 to limit the turning of the handwheel when it is turned from, let us say, the service position to the backwash position, for example, the lever 72, gravitating toward and also being urged toward the rim of the wheel by a coiled tension spring 74 working between the cap 38 and lever 72, as shown, so that after the wheel 60 has been turned, for example, to the backwash position, the lever 72 can be moved radially out of the way against the action of spring 74 to allow the wheel 60 to be turned to the next position, namely the brining position, another stop 69 on the rim 66 serving to limit the turning of the wheel 60 when the valve reaches the brining position. A projection 75 provided on the outer end of the lever 72, and preferably bearing the marking "Press" on its front face serves as a handle for manipulation of the lever 72, at the same time indicating to the operator how the lever 72 is intended to be operated.

In operation, assuming five stops 69 are provided on the rim 66 of handwheel 60 in the proper circumferentially spaced relation, it should be clear that the entire cycle from softening or service position all the way through the regeneration cycle and back to service position could be attended to manually, in the absence of the control mechanism 76. Under those conditions, the operator, at the commencement of regeneration, retracts the stop lever 72 to turn the wheel 60 from service position first to backwash position, at which point the properly adjusted stop 69 for that position of the valve engages the stop lever 72 to limit turning of the wheel 60. The flow for this backwash position of the valve is illustrated in Fig. 11. Legends, "Service" "Backwash" "Salt" "Refill" and "Rinsing" are provided on the front face of the handwheel 60 adjacent the stops 69 as a guide for the operator in turning the handwheel to shift the valve from one position to another. Then, after the backwash operation is completed, the operator again disengages the lever 72 from wheel 60 to permit turning the wheel forward to the brining position, where again another stop 69 properly adjusted for that position of the valve limits turning of the wheel. The flow established in the brining position of the valve is illustrated in Fig. 12, as described in the copending application, the adjustment of the needle valve 110 relative to port 111 determines the amount of raw water supplied in accordance with the extent of desired dilution of the brine, so that one may obtain anything between zero percent brine up to 100 percent saturated brine for the "Brining" operation. After the brining operation is completed, the operator again retracts lever 72 in order to turn wheel 60 to the refill position, where again another stop 69 properly adjusted for that position of the valve limits turning. Then, when the proper water level in the brine tank is restored, the operator retracts lever 72 in order to permit turning wheel 60 to the rinse position, where again a stop 69 limits turning by engagement with lever 72. The flow in the rinsing position of the valve is illustrated in Fig. 13. Finally, after the rinsing operation is completed, the operator again retracts lever 72 long enough to permit the wheel 60 to be turned from the rinsing position to the service position, at which point another stop 69 properly adjusted for that position of the valve again limits turning of the wheel. The flow in the service position of the valve is illustrated in Fig. 10. However, the time required for backwashing and brining is, as a rule, considerably shorter than the time required for rinsing, the rinsing time frequently amounting to about 50% of the entire regeneration time, or even more, and it is obvious, therefore, that it would save the operator a lot of time if the shifting of the valve from rinsing position to service position could be effected automatically at the end of the rinsing period. This is what the control mechanism indicated generally by the reference numeral 76 is provided for. Before going into the details of this automatic control mechanism, attention is called to the inclined portion 77 of the cam 59, which connects the high and low portions of the cam track and is so located as to allow the plunger 48 to be gradually lowered from rinsing position to service position under the action of spring 65 when the handwheel 60 is turned manually through the corresponding angle, the plunger 48 being shown in the service position in Fig. 1. With the automatic control mechanism 76, provision is made for much more abruptly shifting the plunger 48, by superimposing on the inclined portion 77 of the cam 59 another cam 78. The latter forms a continuation of the high level portion of cam 59, and, as shown in Fig. 7, is arranged to rest on roller 58 at its right angle end 79 when the handwheel 60 is shifted to the rinsing position, so as to prevent the plunger 48 from dropping back to its service position, which would otherwise happen as soon as the inclined portion 77 of the cam 59 came into contact with the roller 58. The automatic control mechanism 76, as will now be described, releasably locks the wheel 60 with the cam 78 in the cocked position illustrated in Fig. 7, and keeps the handwheel so locked for the duration of the rinsing operation, using the outer end of the lever 72 as a stop. At the end of the rinsing operation, which has been timed by the clock 80 forming a part of the control mechanism, the lever 72 is released and cam 78 drops off roller 58 under action of spring 65, and the force with which the spring 65 throws the cam 78 upon the release, plus the fact that the anti-friction roller 58 exerts so little resistance to the movement of the cam 78, plus the further fact that the roller 58 encounters the inclined portion 77 of the cam 59 after cam 78 has dropped off the roller, account for the handwheel 60 being turned in a clockwise direction, as viewed in Fig. 4, from the rinse position to the service position.

Figure 4:
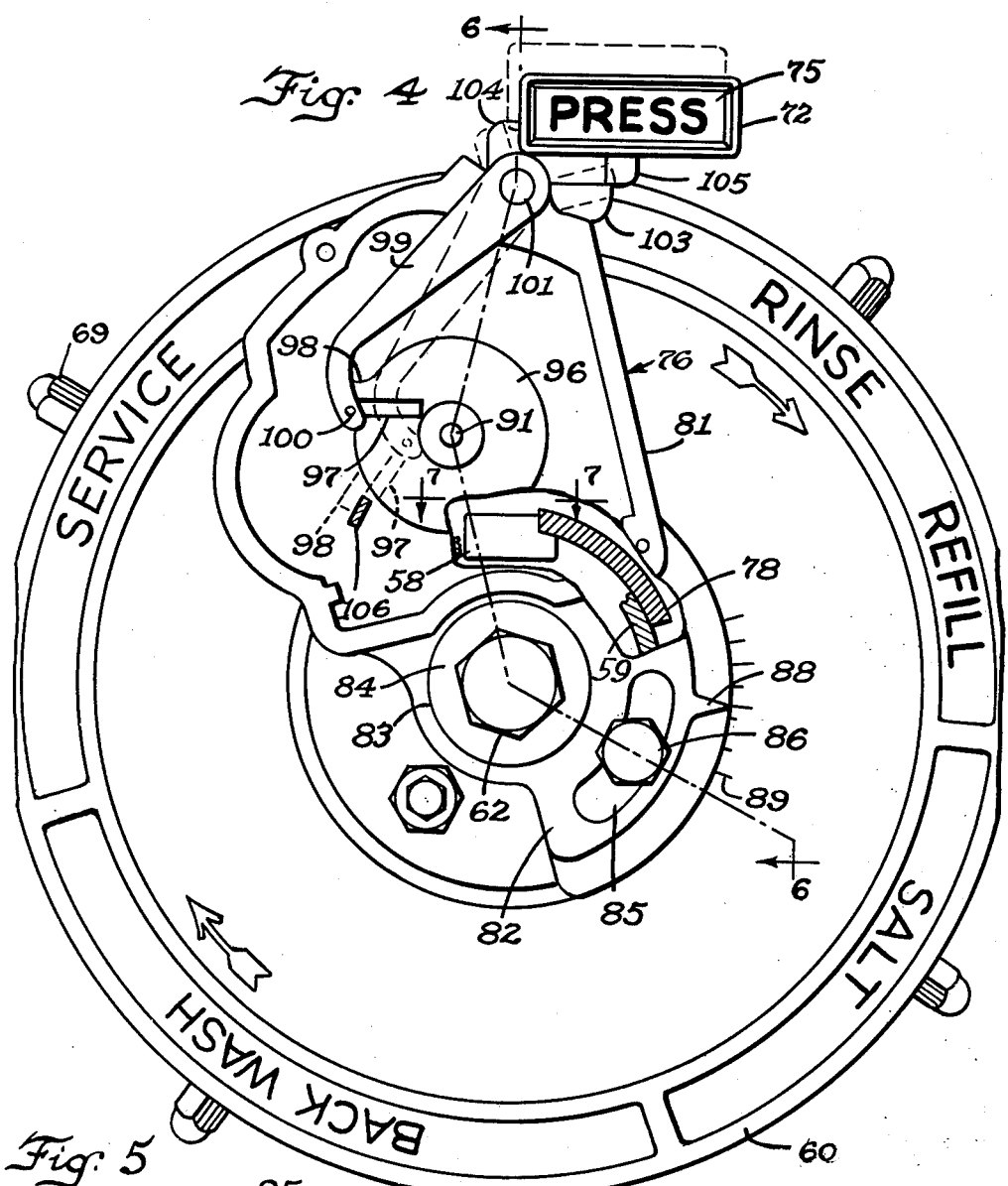
Fig. 4 is a front elevation of the housing of Fig. 3 shown applied to the handwheel of the multiple valve, but having the housing cover plate and clock setting knob removed.
Figure 5:
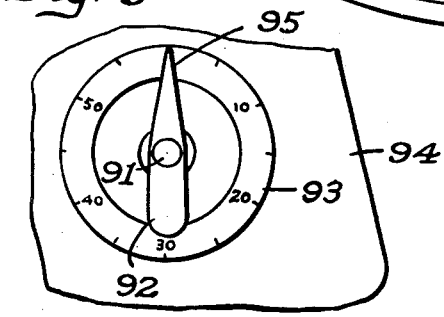
Fig. 5 is a fragmentary front elevation of the housing cover plate showing the dial and the clock setting knob acting as an indicator in connection with the dial.
Figure 6:
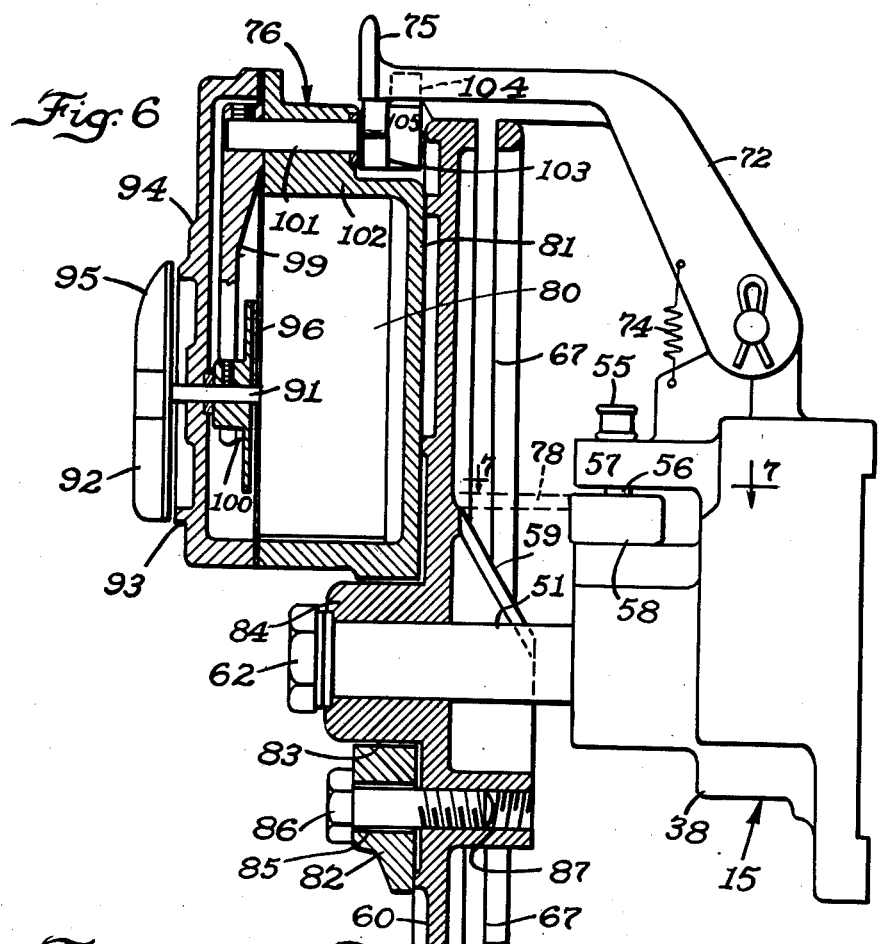
Fig. 6 is a section on the broken line 6—6 of Fig. 4.
Figure 8:
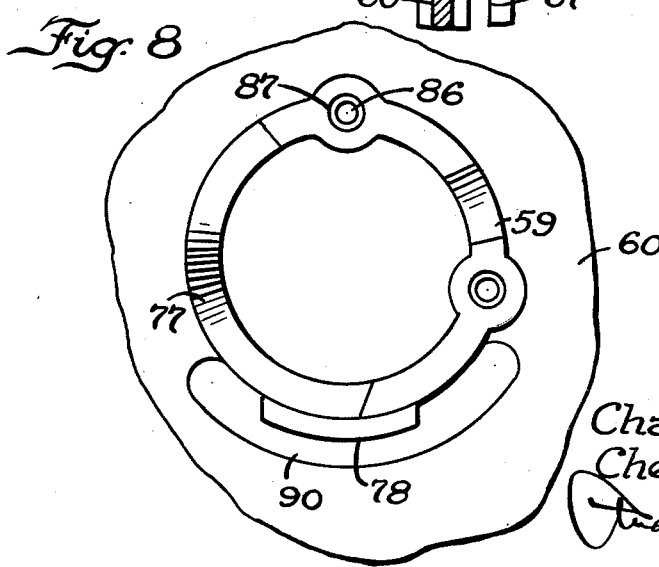
Fig. 8 is a rear view of the central portion of the handwheel illustrating the relationship of the control mechanism's cam projection angularly with respect to the cam-shaped hub portion on the back of the handwheel.

Referring now to Figs. 1, 3, 4, 5, 6, 7 and 8, for an understanding of the construction and mode of operation of the control mechanism 76, as well as the method of attaching the same to the handwheel 60 of an otherwise fully manually operated valve, whereby to make it partially automatic in operation, the reference numeral 81 designates a housing for the aforesaid clock 80, which has cast integral with it an attaching plate portion 82. The latter is of segmental form and has a circular hole 83 provided therein receiving a forwardly projecting hub 84 provided on the handwheel to locate the housing 81 partially with respect to the handwheel. There is an arcuate slot 85 provided in the attaching plate portion 82 in concentric relation to hole 83 which receives a screw 86 threading in a hole 87 provided therefor in the handwheel. This permits angular adjustment of the housing 81 to the exact position desired, after which the screw 86 is adapted to be tightened to hold the housing 81 permanently in the correct position. A pointer 88 provided on the edge of the attaching plate portion 82 cooperates with graduations 89 marked on the face of the handwheel 60 to facilitate setting the housing 81. Close accuracy in the setting of the housing 81 angularly with respect to handwheel 60 is important because the arcuate cam projection 78 is provided on the inner side of the attaching plate portion 82 and, for best results, must be set correctly in relation to the inclined portion 77 of cam 59. An arcuate slot 90 is provided in the handwheel 60 in concentric relation to and radially outwardly from cam 59, as shown in Fig. 8, and the cam projection 78 extends through this slot and is angularly adjustable relative to the cam 59 in said slot, the slot 90 being of such length in relation to slot 85 to permit the full range of adjustment of attaching plate 82 in either direction relative to screw 86. The outer edge of cam 78 is level with the high portion of cam 59, as indicated in Fig. 7. In the angular adjustment of the attaching plate 82 the right angle end 79 of cam 78 is nicely adjusted far enough away from the dead-center point, indicated by the dot and dash line A—B in Fig. 7, to insure operation of the handwheel 60 under action of spring 65 and yet not impose too much of the spring pressure of spring 65 upon the clock 80. This, therefore, calls for a rather fine adjustment and yet one which the average good mechanic will have no difficulty in attending to. The clock 80, which times the rinsing operation, operates like timers on gas ranges, for example, the same having a stem 91 arranged to be turned in one direction by means of a knob or handle 92 relative to a dial 93 that is provided on the outer face of a cover plate 94 through which the stem 91 projects for operation, the clock being set into operation in that way and returning the stem 91 gradually back to the starting point, the run being for whatever time period the operator selected, the same as in the gas range timers, except of course that in the present case the operator will always set the clock 80 for the same run, because a given softener always requires and should have the same length of rinsing operation. A pointer 95 is provided on one end of the knob 92 to cooperate with the graduations on dial 93. An escapement disk 96 fixed to and turning with the stem 91 has a nearly radial slot 97 provided therein next to a stop projection 98 provided on the periphery, and this disc cooperates with an escapement arm 99 which has a pin 100 arranged to ride on the periphery of the disk 96 and enter the slot 97 at the end of the run for which the clock 80 was set, whereby to release the escapement arm 99 and accordingly release the stop lever 72 at the end of the rinsing operation. The escapement arm 99 and disk 96 together form a part of what was first referred to as a "trip" device for releasably locking wheel 60 in "Rinse" position. The escapement arm 99 is attached to one end of a shaft 101 that is mounted for oscillation in a bearing 102 provided in the radially outer side wall of housing 81. This shaft carries two angularly related stop fingers 103 and 104, the first of which, as indicated in the dotted line position shown in Fig. 4, is arranged to come into abutment with a downwardly projecting lug 105 provided on the outer end of lever 72, whereby to limit turning of the handwheel 60 when the latter reaches the "Rinsing" position. The pin 100 on arm 99 is then disposed in the inner end of slot 97, as appears in the dotted line position of arm 99 and disk 96 in Fig. 4. The operator then turns knob 92 in a clockwise direction and sets pointer 95 relative to dial 93 for whatever number of minutes is prescribed for the rinse flow. In this rotation of disk 96, arm 99 is swung outwardly by reason of the pin 100 sliding outwardly in slot 97 and onto the periphery of the disk, and, as a result, stop finger 103 is lowered to the full line position shown in Fig. 4 so as to let projection 105 ride onto the top of finger 103, as shown, which is the "cocked" position. At this time stop finger 104 is raised from the inclined dotted line position to the full line vertical position shown in Fig. 4, in which it has face to face locking abutment with the side of the lever 72, to lock the wheel 60 against turning for the duration of the rinsing operation. Then, when the rinse time has run out and disk 96 again returns to the dotted line position indicated in Fig. 4, where pin 100 reaches the inner end of slot 97, the finger 103, under projection 105, is raised, as shown in dotted lines in Fig. 4, to lift lever 72 clear of finger 104, as indicated also in the dotted line position shown in Fig. 4, thereby releasing wheel 60 so that cam 78 is free to drop off roller 58 under action of spring 65, whereupon wheel 60 is turned automatically to "Service" position. The finger 104 is offset inwardly relative to finger 103, as shown in Figs. 1 and 6, so that there will be nothing to interfere with the wheel 60 turning, because finger 104 cannot strike lug 105 in this turning of wheel 60. Spring 65, although strong enough to operate the valve plunger 48 in the manner described, is sufficiently restrained by reason of the corner portion 79 of the cam 78 being located so close to the dead-center line A—B in the cocked position of the escapement arm 99 illustrated in full lines in Fig. 4, that it has only a relatively small component in the substantially tangential direction in which the finger 104 presses against lever 72, and consequently very little frictional drag is imposed upon the operation of clock 80 by reason of the sliding of pin 100 on the periphery of disk 96 up to the time that pin 100 enters slot 97, as it is about to do in the position in which the disk 96 is shown in full lines in Fig. 4. In the final portion of the rotation of disk 96 when pin 100 rides into slot 97, the spring pressure active on arm 99 actually assists the operation of clock 80 but not with enough force to affect the operation thereof undesirably. At any rate, there is thus avoided the objection so often met in other clock-controlled devices where the clock, when run down at the critical point of performing its intended function, has not enough power to do it.

In operation, when the softener, whose valve 15 is equipped with control mechanism 76, needs regeneration, the handwheel 60 is first operated as in the wholly manually controlled type, namely, by hand, in a clockwise direction, first to "Backwash" position, and, after that, to "Brining" (or "Salt") position, then to "Refill" position, and, after that, to "Rinsing" position, at which point the knob 92 is operated to set the length of time for the rinse flow and at the same time cock the parts 103—105 for automatic tripping of lever 72 for release of the wheel 60 so that the valve 15 will be returned automatically to "Softening" position at the end of the rinse operation. In commencing each of these manual operations of the valve, as described before, the operator must retract the lever 72 in relation to stops 69 by pressure on the front of the handle 75 in order to release the handwheel 60 for turning. After completion of the brining operation, however, the operation of the valve 15 with the control mechanism 76 is different. The operator retracts lever 72 by pressure on handle 75 to release wheel 60 and turns it toward "Rinsing" position until stop finger 103 strikes lug 105 on lever 72. Then he turns knob 92 in a clockwise direction to set the clock 80, stop projection 98 on disk 96 in this operation being moved away from a stop 106 provided on the inside of the cover plate 94 of housing 81. While we have shown what may be a conventional spring driven clock, any suitable timing device may of course be used, such as an electric synchronous motor, a hydraulic timing device, etc. In the clock setting operation, escapement arm 99 of the tripping device is oscillated enough to lower finger 103 under lug 105 and raise finger 104 to vertical operative position engaging lever 72 to hold the wheel 60 against turning with cam 78 resting on roller 58 a little past the dead-center position A—B indicated in Fig. 7. The parts remain in this "cocked" position until the clock 80 has run for the time set, that being the duration of the rinse. When the pin 100 rides off the periphery of the disc 96 into slot 97, escapement arm 99 swings counterclockwise and raises the finger 103 far enough to lift the lever 72 clear of the top of finger 104 so as to release the wheel 60, whereupon the cam 78 drops off roller 58 under action of spring 65, causing the wheel 60 to turn clockwise enough as a result of the "drop-off" and by the action of roller 58 immediately thereafter on the inclined portion 77 of cam 59 to turn the valve to "Service" position. The wheel 60 cannot turn beyond the service position, because the stop 69 at that point on the rim 66 strikes lever 72 to limit rotation of the wheel when it reaches that position. The operator can, of course, leave the softener after setting clock 80 by means of knob 92. In that way his attendance time in the regeneration of the softener is reduced 50% or even more, because the rinse operation represents at least that much of the whole regeneration time. Furthermore, this automatic control mechanism eliminates confusion and guesswork and makes it more certain that the full time necessary for complete rinsing is taken, so that truly soft water will be obtained after each regeneration. The control mechanism 76 is, manifestly, simple and economical to manufacture and easy to apply to existing valves. The operation is certain and positive despite the use of a clock mechanism, because the arrangement is such that no serious drag is ever imposed upon the operation of the clock, but actual assistance to insure its continued operation to the "firing" or "alarm" point is given by virtue of the way pin 100 rides into slot 97.

It is believed the foregoing description conveys a good understanding of the objects and advantages of our invention. The appended claims have been drawn to cover all legitimate modifications and adaptations.

We claim:

1. In a control mechanism of the character described, the combination with a hand-wheel operatively connected with a stem to be turned relative to a body, and means tending to turn said wheel in a certain direction from a certain position, of a lever pivoted at one end to swing relative to said body toward and away from the periphery of said wheel to and from a stop position engaging a projection on the wheel to hold the same releasably, a timer carried by said wheel having a manual setting handle, and a trip device also carried by said wheel operable by said timer at the end of a preset time interval and arranged to swing said lever outwardly from the stop position.

2. In a control mechanism of the character described, the combination with a hand-wheel operatively connected with a stem to be turned relative to a body in which the stem is rotatably mounted, a circular cam turning with the wheel relative to a follower roller carried on the body to transmit endwise movement to the stem in its rotation, and spring means urging the stem endwise in one direction so that the cam tends to turn said wheel in a certain direction from a certain position, of a lever pivoted at one end on said body to swing radially relative to the periphery of said wheel to engage a projection thereon to stop the rotation of the wheel, a timer carried by said wheel having a manual setting handle, and a trip device also carried by said wheel operable by said timer at the end of a preset time interval and arranged to swing said lever outwardly away from the projection.

3. The structure set forth in claim 2 wherein said circular cam includes an inclined portion, the control mechanism including a supplementary arcuate cam placed in tandem relation with the circular cam at the inclined portion and taking over a portion of its length and having an abrupt drop-off formation the high point of which engages said roller in the preset position.

4. In combination, a valve structure comprising a body having an elongated bore and a plurality of radial ports provided therein in endwise and circumferentially spaced relation relative to and communicating with the bore, an elongated valve plunger fitting closely but slidably and rotatably in said bore, spring means normally urging said plunger toward one end of said bore, cooperating cam and follower means on said body and plunger held engaged under the pressure of said spring means predetermining a lowered operative position of said plunger in respect to its endwise and rotary movement and predetermining also a raised operative position of said plunger, said plunger being conformed peripherally so as to function as a plunger type valve with respect to the radial ports in a plurality of different positions of endwise and rotary movement, a hand-wheel affixed to said plunger for manually turning the same to any selected one of a plurality of positions, and a control mechanism selectively connectible with the hand wheel for holding said plunger releasably in raised position for a predetermined length of time.

5. In combination, a valve structure comprising a body having an elongated bore and a plurality of radial ports provided therein in endwise and circumferentially spaced relation relative to and communicating with the bore, an elongated valve plunger fitting closely but slidably and rotatably in said bore, spring means normally urging said plunger toward one end of said bore, cooperating cam and follower means on said body and plunger held engaged under the pressure of said spring means predetermining a lowered operative position of said plunger in respect to its endwise and rotary movement and predetermining also a raised operative position of said plunger, said plunger being conformed peripherally so as to function as a plunger type valve with respect to the radial ports in a plurality of different positions of endwise and rotary movement, a hand-wheel affixed to said plunger for manually turning the same to any selected one of a plurality of positions, a catch selectively connectible with said hand-wheel to hold it against turning from a position corresponding to a raised position of said plunger, and a control mechanism selectively connectible with the catch for operating said catch to release the wheel after the plunger has been in the raised position a predetermined length of time.

6. In combination, a valve structure comprising a body having an elongated bore and a plurality of radial ports provided therein in endwise and circumferentially spaced relation relative to and communicating with the bore, an elongated valve plunger fitting closely but slidably and rotatably in said bore, spring means normally urging said plunger toward one end of said bore, cooperating cam and follower means on said body and plunger held engaged under the pressure of said spring means predetermining a lowered operative position of said plunger in respect to its endwise and rotary movement and predetermining also a raised operative position of said plunger, said plunger being conformed peripherally so as to function as a plunger type valve with respect to the radial ports in a plurality of different positions of endwise and rotary movement, a hand-wheel affixed to said plunger for manually turning the same to any selected one of a plurality of positions, a lever pivoted on the body to swing radially relative to and selectively engageable with the periphery of said wheel to engage any selected one of a plurality of stop projections provided thereon in circumferentially spaced relation, a timer carried by said wheel having a manual setting handle, and a trip device also carried by said wheel selectively operable by said timer at the end of a preset time interval and arranged to swing said lever outwardly away from the selected stop projection.

7. In combination with a rotary hand-wheel affixed to and adapted for turning a stem relative to a fixed member, means connected with the wheel tending to turn it in one direction, and a lever pivoted at one end on said fixed member to swing radially relative to stop projections on the periphery of said wheel to and from a stop position, of a clock-type timer carried by said wheel having a manual setting handle whereby the timer is adapted to be set to operate for a selected length of time, and a trip device also carried by said wheel operable by said timer at the end of a preset time interval and arranged to swing said lever outwardly from the stop position.

8. In combination with a rotary hand-wheel affixed to and adapted for turning a stem relative to a fixed member, the wheel tending to turn in one direction, a circular cam turning with the wheel relative to a follower roller carried on the fixed member so as to transmit endwise movement to said stem in its rotation, means connected with said stem tending to move it endwise in one direction relative to said fixed member, and a lever pivoted at one end on said fixed member to swing radially relative to stop projections on the periphery of said wheel to and from a stop position, of a timer carried by said wheel having a manual setting handle, and a trip device also carried by said wheel operable by said timer at the end of a preset time interval and arranged to swing said lever outwardly from the stop position.

9. In combination with a rotary hand-wheel affixed to and adapted for turning a stem relative to a fixed member, the wheel tending to turn in one direction, a circular cam turning with the wheel relative to a follower roller carried on the fixed member so as to transmit endwise movement to said stem in its rotation, means connected with said stem tending to move it endwise in one direction relative to said fixed member, and a lever pivoted at one end on said fixed member to swing radially relative to stop projections on the periphery of said wheel to and from a stop position, of a timer device including a housing with an attaching plate portion in which an opening is provided adapted to receive a projection provided on the central portion of said wheel so as to permit angular adjustment of said timer device relative to said wheel, the timer device including an auxiliary arcuate cam on the attaching plate portion concentric with the aforesaid opening and arranged to be angularly adjusted relative to the circular cam and follower roller to determine a drop-off setting of the wheel relative to the follower roller in the time-set position of the wheel, means for fastening said attaching plate portion to said wheel in angularly adjusted position, a timer in said housing manually settable to predetermine the length of time the wheel is to be held in the drop-off position, and a trip device operable by said timer at the end of the preset time interval and adapted to swing said lever outwardly from its operative position.

10. In combination with a rotary hand-wheel affixed to and adapted for turning a stem relative to a fixed member, means connected with the wheel tending to turn it in one direction, and a catch for holding said wheel releasably in a selected position, of a timer device including a housing with an attaching plate portion in which an opening is provided adapted to receive a projection provided on the central portion of said wheel so as to permit angular adjustment of said timer device relative to said wheel, the timer device including an auxiliary arcuate cam on the attaching plate portion concentric with the aforesaid opening and arranged to be angularly adjusted relative to the circular cam and follower roller to determine a drop-off setting of the wheel relative to the follower roller in the time-set position of the wheel, means for fastening said attaching plate portion to said wheel in angularly adjusted position, a clock-type timer in said housing manually settable to predetermine the length of time the wheel is to be held in the drop-off position, and a trip device operable by said timer at the end of the preset time interval to release said catch.

11. In a "load and fire" mechanism the combination with a rotary member having a circular cam turning with it relative to a follower roller, and spring means tending to urge the rotary member toward said roller, so that when the cam is set at a drop-off position to one side of dead center relative to the roller the spring means has a small component tangentially of said rotary member tending to turn it in one direction, a catch arranged to gravitate toward said rotary member to engage a projection thereon, holding the rotary member in the aforesaid set position, an escapement arm oscillatably mounted on the rotary member having a stop finger on its pivoted end arranged to engage said catch, an escapement disk having an inwardly extending slot in which a projection on the free end of said arm is arranged to move to incline the finger from a holding position to a catch releasing position, and a timer connected with and arranged to turn said disk.

12. In a control mechanism of the character described, the combination with a hand wheel operatively connected with a stem that is adapted to be turned and moved endwise relative to a body in which the stem is rotatably and slidably mounted, spring means tending to move said stem in one direction, and cam means rotatable with the wheel tending to turn said wheel in a certain direction from a certain position upon endwise movement of the stem under action of said spring means, of a lever pivoted at one end to swing relative to said body toward and away from the periphery of said wheel to and from a stop position engaging a projection on the wheel to hold the same releasably, a timer carried by said wheel having a manual setting handle, and a trip device also carried by said wheel operable by said timer at the end of a preset time interval and arranged to swing said lever outwardly from the stop position.

13. In a "load and fire" mechanism, the combination with a rotary member having a circular cam turning with it relative to a follower roller, and spring means tending to urge the rotary member toward said roller, so that when the cam is set at a drop-off position to one side of dead-center relative to the roller, the spring means has a small component tangentially of the rotary member tending to turn it in one direction, a catch arranged to gravitate toward said rotary member to engage a projection thereon, holding the rotary member in the aforesaid set position, an escapement arm oscillatably mounted on the rotary member having on its pivoted end two fingers, one of which is arranged to engage one side of the catch to prevent rotation of the wheel, and the other of which is arranged to engage the catch from below to lift it to released position relative to the first mentioned finger upon oscillation of said escapement arm so as to permit the wheel to turn, an escapement disk having an inwardly extending slot in which a projection on the free end of said arm is arranged to move for oscillation of the escapement arm from wheel holding position to wheel releasing position, and a timer connected with and arranged to turn said disk.

References Cited in the file of this patent

UNITED STATES PATENTS

| | | |
|---|---|---|
| 1,330,721 | Riddle | Feb. 10, 1920 |
| 1,910,004 | De Ville | May 23, 1933 |
| 1,926,168 | Nylander | Sept. 12, 1933 |
| 1,938,628 | Huppertz | Dec. 12, 1933 |
| 2,347,201 | Lindsay | Apr. 25, 1944 |